(12) United States Patent
Dalmatov

(10) Patent No.: US 11,199,968 B2
(45) Date of Patent: Dec. 14, 2021

(54) USING RECURRING WRITE QUOTAS TO OPTIMIZE UTILIZATION OF SOLID STATE STORAGE IN A HYBRID STORAGE ARRAY

(71) Applicant: EMC IP Holding Company LLC, Hopkinton, MA (US)

(72) Inventor: Nickolay Alexandrovich Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 522 days.

(21) Appl. No.: 16/302,380

(22) PCT Filed: Oct. 26, 2017

(86) PCT No.: PCT/RU2017/000788
§ 371 (c)(1),
(2) Date: Nov. 16, 2018

(87) PCT Pub. No.: WO2019/083390
PCT Pub. Date: May 2, 2019

(65) Prior Publication Data
US 2021/0223955 A1 Jul. 22, 2021

(51) Int. Cl.
*G06F 3/06* (2006.01)
(52) U.S. Cl.
CPC .......... *G06F 3/0604* (2013.01); *G06F 3/0665* (2013.01); *G06F 3/0685* (2013.01); *G06F 3/0689* (2013.01)
(58) Field of Classification Search
CPC .... G06F 3/0604; G06F 3/0665; G06F 3/0685; G06F 3/0689; G06F 3/0616; G06F 3/0649; G06F 2212/7204
See application file for complete search history.

(56) References Cited

U.S. PATENT DOCUMENTS 5,345,584 A 9/1994 Hill
5,734,861 A 3/1998 Cohn et al.
(Continued)

FOREIGN PATENT DOCUMENTS

WO 20160072971 5/2016

OTHER PUBLICATIONS

EMC, "EMC Celerra Automated Storage Tiering Applied Best Practices Guide", Aug. 2009, P/N h6499, pp. 1-36.
(Continued)

*Primary Examiner* — Michelle T Bechtold
(74) *Attorney, Agent, or Firm* — BainwoodHuang

(57) ABSTRACT

A technique operates multiple data storage tiers including a solid state drive (SSD) storage tier having SSD storage components and a hard disk drive (HDD) storage tier having magnetic disk devices. The technique involves establishing write quotas for the SSD storage components of the SSD storage tier. Each write quota identifies an amount of data that is permitted to be written to a respective SSD storage component during a predefined amount of time. The technique further involves consuming the write quotas in response to write operations performed on the SSD storage components of the SSD storage tier. The technique further involves, in response to a particular write quota for a particular SSD storage component of the SSD storage tier becoming fully consumed, performing a set of remedial activities on the multiple storage tiers to protect operation of the particular SSD storage component of the SSD storage tier.

20 Claims, 7 Drawing Sheets

(56) References Cited

U.S. PATENT DOCUMENTS

| | | |
|---|---|---|
| 6,173,306 B1 | 1/2001 | Raz et al. |
| 8,706,960 B1 | 4/2014 | Ives et al. |
| 8,935,493 B1 | 1/2015 | Dolan et al. |
| 9,311,002 B1 | 4/2016 | Scott et al. |
| 9,330,105 B1 | 5/2016 | Duprey et al. |
| 9,383,940 B1 | 7/2016 | Ives et al. |
| 9,594,514 B1 | 3/2017 | Bono et al. |
| 9,684,593 B1 | 6/2017 | Chen et al. |
| 9,703,664 B1 | 7/2017 | Alshawabkeh et al. |
| 9,940,033 B1 | 4/2018 | Alshawabkeh et al. |
| 9,965,218 B1 | 5/2018 | Martin et al. |
| 10,025,523 B1 | 7/2018 | Dagan et al. |
| 10,073,621 B1 | 9/2018 | Foley et al. |
| 10,078,569 B1 | 9/2018 | Alshawabkeh et al. |
| 10,089,026 B1 | 10/2018 | Puhov et al. |
| 10,095,425 B1 | 10/2018 | Martin |
| 10,126,988 B1 | 11/2018 | Han et al. |
| 10,140,041 B1 | 11/2018 | Dong et al. |
| 10,146,447 B1 | 12/2018 | Dong et al. |
| 10,146,456 B1 | 12/2018 | Gao et al. |
| 10,146,459 B1 | 12/2018 | Gao et al. |
| 10,146,624 B1 | 12/2018 | Gong et al. |
| 10,146,646 B1 | 12/2018 | Foley et al. |
| 10,152,254 B1 | 12/2018 | Kang et al. |
| 2002/0095532 A1 | 7/2002 | Surugucchi et al. |
| 2003/0065883 A1 | 4/2003 | Bachmat |
| 2006/0161807 A1 | 7/2006 | Dawkins |
| 2006/0212746 A1 | 9/2006 | Amegadzie et al. |
| 2008/0028164 A1 | 1/2008 | Ikemoto et al. |
| 2008/0059749 A1 | 3/2008 | Gerber et al. |
| 2010/0250501 A1 | 9/2010 | Mandagere et al. |
| 2011/0138106 A1* | 6/2011 | Prabhakaran ....... G06F 12/0888 711/103 |
| 2012/0259901 A1 | 10/2012 | Lee et al. |
| 2013/0275653 A1 | 10/2013 | Ranade et al. |
| 2014/0095439 A1 | 4/2014 | Ram |
| 2015/0134926 A1 | 5/2015 | Yang et al. |
| 2016/0034206 A1* | 2/2016 | Ryan ................... G06F 12/0246 711/103 |
| 2016/0188401 A1 | 6/2016 | Shen et al. |
| 2016/0259594 A1* | 9/2016 | Takahashi ............. G06F 3/0608 |
| 2017/0285972 A1 | 10/2017 | Dalmatov |

OTHER PUBLICATIONS

EMC, "EMC VNX@ Unified Best Practices for Performance Applied Best Practice Guide", Oct. 2005, P/N H10938.8, pp. 1-37.
EMC, "Managing Data Relocation in Storage Systems", United States U.S. Appl. No. 13/929,664, filed Jun. 27, 2013.
Tomek, "EMC VNX-Fast VP Explained—Storage Freak", retrieved from http://www.storagefreak.net/2014/06/emc-vnx-fast-vp-explained, Jun. 2, 2014, pp. 1-6.
International Search Report and the Written Opinion from International Searching Authority (RU) for International Application No. PCT/RU2017/000788, dated Aug. 2, 2018, 9 pages.

* cited by examiner

USING RECURRING WRITE QUOTAS TO OPTIMIZE UTILIZATION OF SOLID STATE STORAGE IN A HYBRID STORAGE ARRAY

BACKGROUND

Conventional data storage systems maintain host data within storage devices on behalf of one or more host computers. Some conventional data storage systems store host data in tiered storage that includes a tier of flash memory drives and another tier of magnetic hard disks.

Regarding the tier of flash memory drives, flash memory drive vendors typically specify that their flash memory drives should work properly for a specified number of write cycles (i.e., the number of times each page of the flash drive can be written). To avoid exceeding a flash memory drive vendor's write cycle specification, data storage system operators typically schedule proactive flash memory drive replacement to avoid unexpected data loss.

For example, supposed that that a data storage system operator obtains flash memory drives that have been specified to endure 10,000 write cycles and that the data storage system operator expects each page of each flash memory drive to be written 10 times per day (i.e., to endure 10 write cycles per day or WPDs). Accordingly, the data storage system operator may schedule replacement of the flash memory drives in 1000 days (i.e., in just under 3 years).

On the other hand, supposed that that the data storage system operator expects each page of each flash memory drive to be written only 5 times per day (i.e., 5 WPDs). In this situation, the data storage system operator may schedule replacement of the flash memory drives in 2000 days (i.e., in just over 5 years).

SUMMARY

Unfortunately, there are deficiencies to the above-described conventional approach which simply relies on vendor specifications and expected write cycles per day to replace flash memory drives. Along these lines, some flash memory drive vendors may specify the write cycle limit for a particular flash memory drive model based on worst case testing. However, many flash memory drives may be able to significantly outlive the vendor's specified write cycle limit. For example, some studies have shown that healthy flash memory drives (e.g., flash memory drives that have encountered only a few faults if any) may outlive the vendor's specified write cycle limit many times over, e.g., double the write cycle limit, triple the write cycle limit, six times the write cycle limit, etc.

Furthermore, the data storage system may not write to all of the flash memory drives evenly thus causing certain flash memory drives to perform more write operations than others. Such uneven wear may cause some flash memory drives to reach their specified write cycle limit faster than other flash memory drives and ahead of schedule while other flash memory drives reach their specified write cycle limit much slower and thus at a much later time. As a result, although some flash memory drives may reach their write cycle limit when the data storage system operator replaces the flash memory drives in accordance with a schedule that is simply based on vendor specifications and expected write cycles per day, other flash memory drives may not have come close to reaching their write cycle limit at the time of replacement.

In contrast to the above-described conventional approach which may waste flash memory drive endurance capacity by naïvely replacing flash memory drives simply based on vendor specifications in view of expected write cycles per day, improved techniques are directed to using recurring write quotas to optimize utilization of solid state storage in a hybrid storage array (e.g., a storage array with storage tiers having different types of storage devices). Such recurring write quotas are allocated budgets for write operations for a given time period and may be based on a variety of measured (or counted) reliability and/or healthiness factors. Example factors include the number of read errors, the number of write errors, the number of unrecoverable errors, the number of faulted pages, write amplification metrics, and so on. Moreover, when a recurring write quota has been consumed for a particular solid state drive (SSD) storage component (e.g., for a RAID group formed by multiple SSD devices or simply SSDs, for a single SSD, etc.), the circuitry controlling the hybrid storage array may automatically perform a remedial activity such as block further write operations to that SSD storage component for an amount of time, direct at least some write operations to an alternative SSD storage component to provide even wearing or to a hard disk drive (HDD) storage tier having magnetic disk devices, move data within a storage tier or between storage tiers, alert a user, combinations thereof, and so on.

One embodiment is directed to a method of operating multiple data storage tiers including a SSD storage tier having SSD storage components and a HDD storage tier having magnetic disk devices. The method includes establishing write quotas for the SSD storage components of the SSD storage tier. Each write quota identifies an amount of data that is permitted to be written to a respective SSD storage component during a predefined amount of time. The method further includes consuming the write quotas in response to write operations performed on the SSD storage components of the SSD storage tier. The method further includes, in response to a particular write quota for a particular SSD storage component of the SSD storage tier becoming fully consumed, performing a set of remedial activities on the multiple storage tiers to protect operation of the particular SSD storage component of the SSD storage tier.

In some arrangements, performing the set of remedial activities on the multiple storage tiers includes, in response to the particular write quota for the particular SSD storage component of the SSD storage tier becoming fully consumed, blocking further write instructions to the particular SSD storage component of the SSD storage tier during the predefined amount of time. Such operation prevents the particular SSD storage component from performing further write operations during the predefined amount of time.

In some arrangements, performing the set of remedial activities on the multiple storage tiers further includes, while the further write instructions to the particular SSD storage component are being blocked, processing the further write instructions on a set of other SSD storage components of the SSD storage tier to store data of the further write instructions. The particular SSD storage component is omitted from the set of other SSD storage components.

In some arrangements, performing the set of remedial activities on the multiple storage tiers further includes, while the further write instructions to the particular SSD storage component are being blocked, processing the further write instructions on a set of magnetic disk devices of the HDD storage tier to store data of the further write instructions. Such operation is capable of providing a balance between the goals of minimizing latency (e.g., as data is written to SSD storage) and reaching an expected SSD lifetime (e.g., as further data is written to HDD storage to preserve SSD lifetime). In some arrangements, performing the set of remedial activities on the multiple storage tiers further includes, while the further write instructions to the particular SSD storage component are being blocked, moving data from the particular SSD storage component to a set of other SSD storage components of the SSD storage tier. The particular SSD storage component is omitted from the set of other SSD storage components.

In some arrangements, performing the set of remedial activities on the multiple storage tiers further includes, while the further write instructions to the particular SSD storage component are being blocked, moving data from the particular SSD storage component to a set of magnetic disk devices of the HDD storage tier.

In some arrangements, the method further includes, after blocking the further write instructions to the particular SSD storage component of the SSD storage tier during the predefined amount of time and in response to expiration of the predefined amount of time, establishing a new write quota for the particular SSD storage component of the SSD storage tier. The new write quota (i) replaces the particular write quota and (ii) identifies a new amount of data that is permitted to be written to the particular SSD storage component during another predefined amount of time. The method further includes consuming the new write quota in response to new write operations performed on the particular SSD storage component of the SSD storage tier and, in response to the new write quota for the particular SSD storage component of the SSD storage tier becoming fully consumed, performing a new set of remedial activities on the multiple storage tiers to protect operation of the particular SSD storage component of the SSD storage tier.

In some arrangements, establishing the write quotas for the SSD storage components of the SSD storage tier includes generating health indicators for the SSD storage components of the SSD storage tier. Each health indicator identifies a measure (or amount) of healthiness for a respective SSD storage component of the SSD storage tier.

In some arrangements, generating the health indicators for the SSD storage components of the SSD storage tier includes receiving error counts from the SSD storage components of the SSD storage tier, and deriving the health indicators for the SSD storage components of the SSD storage tier based on the error counts received from the SSD storage components.

In some arrangements, deriving the health indicators for the SSD storage components of the SSD storage tier based on the error counts received from the SSD storage components includes deriving a first health indicator for a first SSD storage component of the SSD storage tier based on a first set of error counts received from the first SSD storage component. The first set of error counts identifies a respective set of errors encountered by the first SSD storage component during operation of the first SSD storage component. In these arrangements, deriving the health indicators further includes deriving a second health indicator for a second SSD storage component of the SSD storage tier based on a second set of error counts received from the second SSD storage component. The second set of error counts identifies a respective set of errors encountered by the second SSD storage component during operation of the second SSD storage component.

In some arrangements, establishing the write quotas for the SSD storage components of the SSD storage tier further includes providing the write quotas for the SSD storage components of the SSD storage tier based on the health indicators generated for the SSD storage components of the SSD storage tier.

In some arrangements, providing the write quotas for the SSD storage components of the SSD storage tier includes generating the write quotas for the SSD storage components of the SSD storage tier based on (i) the health indicators generated for the SSD storage components of the SSD storage tier and (ii) specified periods of usage time remaining for the SSD storage components of the SSD storage tier.

In some arrangements, generating the write quotas for the SSD storage components of the SSD storage tier based on the health indicators generated for the SSD storage components of the SSD storage tier and the specified periods of usage time remaining for the SSD storage components of the SSD storage tier includes deriving a first write quota for the first SSD storage component of the SSD storage tier based on the first health indicator for the first SSD storage component. The first health indicator identifies a measure of healthiness for the first SSD storage component of the SSD storage tier, and the first write quota identifies an amount of data that is permitted to be written to the first SSD storage component during the predefined amount of time. In these arrangements, generating the write quotas further includes deriving a second write quota for the second SSD storage component of the SSD storage tier based on the second health indicator for the second SSD storage component. The second health indicator identifies a measure of healthiness for the second SSD storage component of the SSD storage tier, and the second write quota identifies an amount of data that is permitted to be written to the second SSD storage component during the predefined amount of time.

In some arrangements, consuming the write quotas includes consuming the first write quota for the first SSD storage component and the second write quota for the second SSD storage component at different rates in response to data being written to the first SSD storage component and the second SSD storage component at different rates during a same window of time.

In some arrangements, the method further includes, in response to a change in usage pattern of the first SSD storage component, updating the first write quota from a first amount of data that is permitted to be written to the first SSD storage component during the predefined amount of time to a second amount of data that is permitted to be written to the first SSD storage component during the predefined amount of time, the second amount of data being different from the first amount of data.

In some arrangements, the method further includes updating the first health indicator from a first measure of healthiness for the first SSD storage component to a second measure of healthiness for the first SSD storage component, the second measure of healthiness being different from the first measure of healthiness.

In some arrangements, deriving the first write quota for the first SSD storage component of the SSD storage tier includes ascertaining a remaining number of program erase (PE) cycles available for the first SSD storage component based on (i) the first health indicator for the first SSD storage component and (ii) a current total number of PE-cycles performed by the first SSD storage component. Additionally, deriving the second write quota for the second SSD storage component of the SSD storage tier includes ascertaining a remaining number of PE-cycles available for the second SSD storage component based on (i) the second health indicator for the second SSD storage component and (ii) a current total number of PE-cycles performed by the second SSD storage component. Furthermore, the current total number of PE-cycles performed by the first SSD storage component and the current total number of PE-cycles performed by the second SSD storage component are different.

Another embodiment is directed to data storage equipment which includes a host interface operative to communicate with a set of host computers, a storage interface operative to communicate with multiple data storage tiers including a SSD storage tier having SSD storage components and a HDD storage tier having magnetic disk devices. The data storage equipment further includes memory, and control circuitry coupled to the host interface, the storage interface, and the memory. The memory stores instructions which, when carried out by the control circuitry, cause the control circuitry to:

- (A) establish write quotas for the SSD storage components of the SSD storage tier, each write quota identifying an amount of data that is permitted to be written to a respective SSD storage component during a predefined amount of time in response to write requests from the set of host computers,
- (B) consume the write quotas in response to write operations performed on the SSD storage components of the SSD storage tier, and
- (C) in response to a particular write quota for a particular SSD storage component of the SSD storage tier becoming fully consumed, perform a set of remedial activities on the multiple storage tiers to protect operation of the particular SSD storage component of the SSD storage tier while the SSD storage tier operates concurrently with the HDD storage tier having the magnetic disk devices to store data on behalf of the set of host computers.

Yet another embodiment is directed to a computer program product having a non-transitory computer readable medium which stores a set of instructions to operate multiple data storage tiers including a SSD storage tier having SSD storage components and a HDD storage tier having magnetic disk devices. The set of instructions, when carried out by computerized circuitry, causes the computerized circuitry to perform a method of:

- (A) establishing write quotas for the SSD storage components of the SSD storage tier, each write quota identifying an amount of data that is permitted to be written to a respective SSD storage component during a predefined amount of time;
- (B) consuming the write quotas in response to write operations performed on the SSD storage components of the SSD storage tier; and
- (C) in response to a particular write quota for a particular SSD storage component of the SSD storage tier becoming fully consumed, performing a set of remedial activities on the multiple storage tiers to protect operation of the particular SSD storage component of the SSD storage tier.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in using recurring write quotas to optimize utilization of solid state storage in a hybrid storage array.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to using recurring write quotas to optimize utilization of solid state storage in a hybrid storage array (e.g., a data storage array with storage tiers formed using different types of data storage devices). Such recurring write quotas are allocated budgets for write operations for a given time period and may be based on a variety of measured (or counted) reliability and/or healthiness factors. Example factors include the number of read errors, the number of write errors, the number of unrecoverable errors, the number of faulted pages, write amplification metrics, and so on. Moreover, when a write quota has been consumed for a particular solid state drive (SSD) storage component (e.g., for a RAID group formed by multiple SSDs, for a single SSD, etc.), control circuitry may automatically perform a remedial activity such as block further write operations to that SSD storage component for an amount of time, direct at least some write operations to an alternative SSD storage component to provide even wearing or to a hard disk drive (HDD) storage tier having magnetic disk devices, move data within the same storage tier or between storage tiers, alert a user, combinations thereof, and so on.

Figure 1:
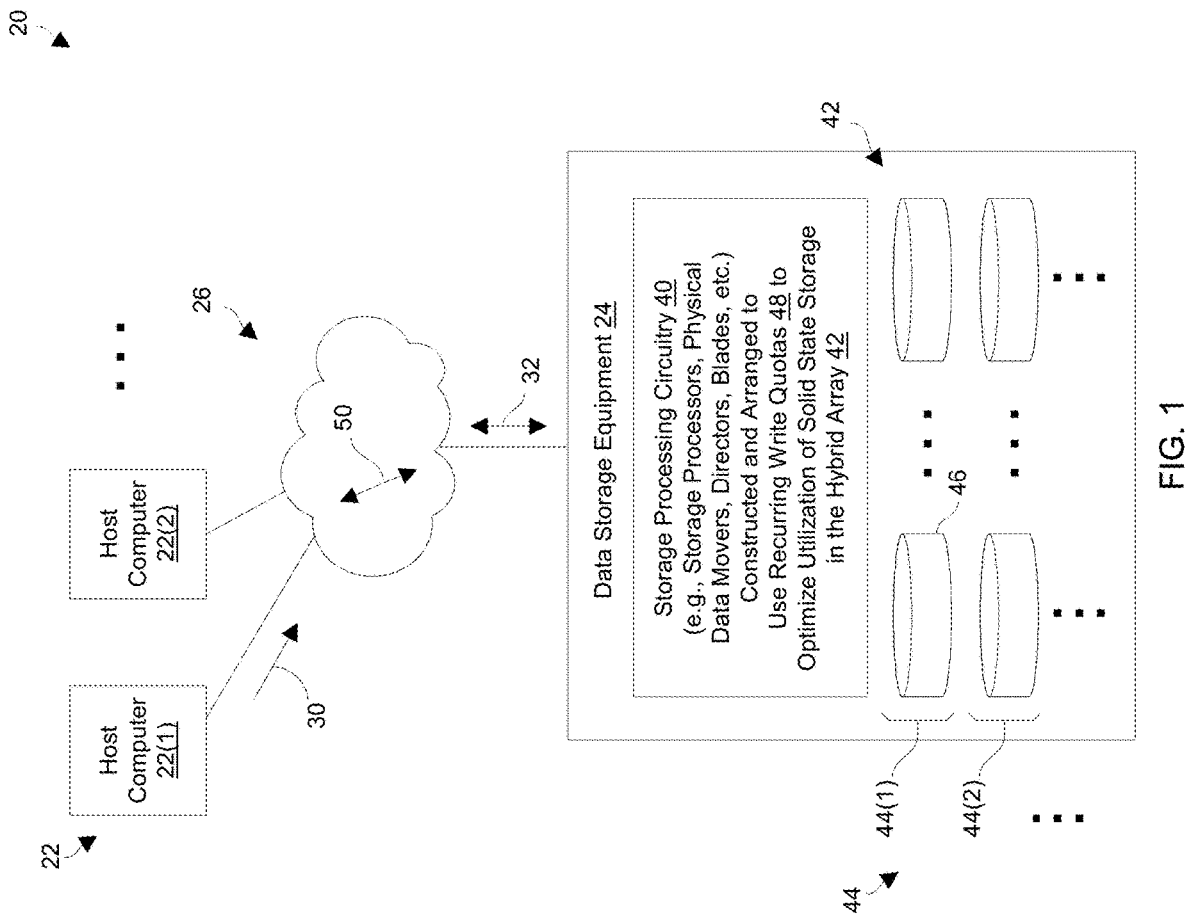
FIG. 1 is a block diagram of a data storage environment which uses recurring write quotas to optimize utilization of solid state storage in a hybrid storage array in accordance with certain example embodiments.

FIG. 1 shows a data storage environment 20 which uses recurring write quotas to optimize utilization of solid state storage in a hybrid storage array in accordance with certain example embodiments. The data storage environment 20 includes a set of host computers 22(1), 22(2), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, combinations thereof, and so on, which provides I/O requests 30 (e.g., small computer system interface or SCSI commands) to the data storage equipment 24. Such I/O requests 30 direct the data storage equipment 24 to store and retrieve host data 32 on behalf of the host computers 22.

The data storage equipment 24 includes storage processing circuitry 40 and a hybrid data storage array 42 having data storage tiers 44(1), 44(2), . . . (collectively, storage tiers 44) formed of different types of data storage devices. The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 responds to the I/O requests 30 from the host computers 22 by robustly and reliably storing the host data 32 into and retrieving the host data 32 from the hybrid array 42.

Each data storage tier 44 of the hybrid array 42 includes multiple storage devices (illustrated using disk symbols in FIG. 1). Although only two storage tiers 44 are shown in FIG. 1 for simplicity, it should be understood that the hybrid array 42 may include a different number of storage tiers 44 (e.g., three, four, etc.). Furthermore, the storage devices that form such tiers 44 may differ in terms of architecture (e.g., single-level cell SSD, multi-level cell SSD, magnetic disk, etc.), speed (e.g., 7200 RPM, 10,000 RPM, etc.), usage/adapter category (e.g., SAS, NL-SAS, etc.), storage capacity, power consumption, RAID level, and so on.

At least one data storage tier 44 includes a set of SSD storage components 46. Each SSD storage component 46 includes at least one SSD device (or simply SSD) to provide fast access to non-volatile storage. One should appreciate that SSD storage is generally faster (i.e., shorter response times when reading and/or writing data) but typically more expensive than HDD storage.

With the various storage tiers 44 offering different storage characteristics such as different data access times, storage capacities, etc., the data storage equipment 24 is able to perform smart and effective data placement as well as a variety of ancillary tiered storage services (e.g., auto-tiering, etc.). As will be explained in further detail shortly, the storage processing circuitry 40 of the data storage equipment 24 controls access to the SSD storage components 46 based on recurring write quotas 48. Accordingly, the data storage equipment 24 is able to enjoy certain efficiencies and optimizations such as even wearing of storage components, avoidance of exceeding endurance limits, enhanced monitoring, and so on.

The communications medium 26 is constructed and arranged to connect the various components of the data storage environment 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, fabric, loop, irregular, combinations thereof, and so on. Along these lines, the communications medium 26 may include copper-based data communications devices and cabling, fiber optic communications devices and cabling, wireless communication devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

During operation, the storage processing circuitry 40 of the data storage equipment 24 writes host data 32 to the hybrid array 42 and reads host data 32 from the hybrid array 42 in response to the I/O requests 30. During such operation, the storage processing circuitry 40 consumes the recurring write quotas 48 for the SSD storage components 46 in response to writing the host data 32 to the SSD storage components 46. Additionally, the storage processing circuitry 40 routinely re-computes the recurring write quotas 48 for the SSD storage components 46 based on healthiness information for each of the SSD storage components 46. Such operation enables the storage processing circuitry 40 to optimize utilization of solid state storage within the data storage tier 44(1) that includes the set of SSD storage components 46 (FIG. 1).

Each recurring write quota 48 identifies an amount of remaining write capacity for a respective SSD storage component 46 during the remainder of a recurring time period (e.g., a week, a day, an hour, etc.). It should be understood that a variety of techniques are suitable for implementing the recurring write quotas 48.

For example, within a current time period such as a day or an hour, the write quota 48 for a particular SSD storage component 46 can be initially set to a particular value that represents the total amount of data allowed to be written to that SSD storage component 46 during that time period or the total number of program-erase (PE) cycles allowed to be performed by that SSD storage component 46 during that time period. Then, as data is actually written to the particular SSD storage component 46 during that time period, the write quota 46 is consumed commensurately (e.g., the remaining write quota 46 for the particular SSD storage component 46 is reduced). As long as the write quota 46 has not reached zero, the write quota 46 has not been fully consumed. However, when the write quota 46 reaches zero, the write quota 46 is considered fully consumed.

In another example, within the current time period, the total amount of data allowed that has been written to a particular SSD storage component 46 or the total number of program-erase (PE) cycles that have been performed by the particular SSD storage component 46 (i.e., the write quota 48) can be compared to a quota threshold to determine whether a write quota 48 for a particular SSD storage component 46 has been fully consumed. If the quota threshold has not yet been reached, the write quota 48 is considered to not be fully consumed. However, if the quota threshold has been reached, the write quota 48 is considered to be fully consumed. Other quota implementation techniques are suitable for use as well.

In response to results from the quota evaluation operations indicating that recurring write quotas 48 for certain SSD storage components 46 have been fully consumed during their respective time periods, the storage processing circuitry 40 performs remedial activities to control access to those SSD storage components 46 during the remainder of those time periods. Along these lines, during the remainder of the time periods, the storage processing circuitry 40 may temporarily direct write operations to different SSD storage components 46 (e.g., to other SSD storage components 46 that have remaining write operations before their write quotas are fully consumed or to HDDs) to provide even wearing, alert a user, combinations thereof, and so on.

In accordance with certain embodiments, the write quota 48 for each SSD storage component 46 is based on a healthiness indicator (e.g., "unhealthy", "healthy", "exceptional", etc.) for that SSD storage component 46. Such an indicator identifies a measure of reliability/faultiness of that SSD storage component 46.

For example, the storage processing circuitry 40 may start each SSD storage component 46 with a "normal" (or "healthy") healthiness indicator at the onset of operation. However, due to health assessments performed on the SSD storage components 46, the storage processing circuitry 40 updates the healthiness indicators for the SSD storage components 46 based on recurring health assessments and the healthiness indicators may change over time. Along these lines, the storage processing circuitry 40 may deem a SSD storage component 46 that has an abnormally high number of errors/faults to be "unhealthy", but deem another SSD storage component 46 that has an unusually low number of error/faults to be "exceptional". Due to changes in these healthiness indicators and variations in how the SSD storage components 46 are utilized over time, the storage processing circuitry 40 updates the write quotas 48 for each SSD storage component 46 and thus the write quotas 46 may change from their original values to new values. Further details will now be provided with reference to FIG. 2.

Figure 2:
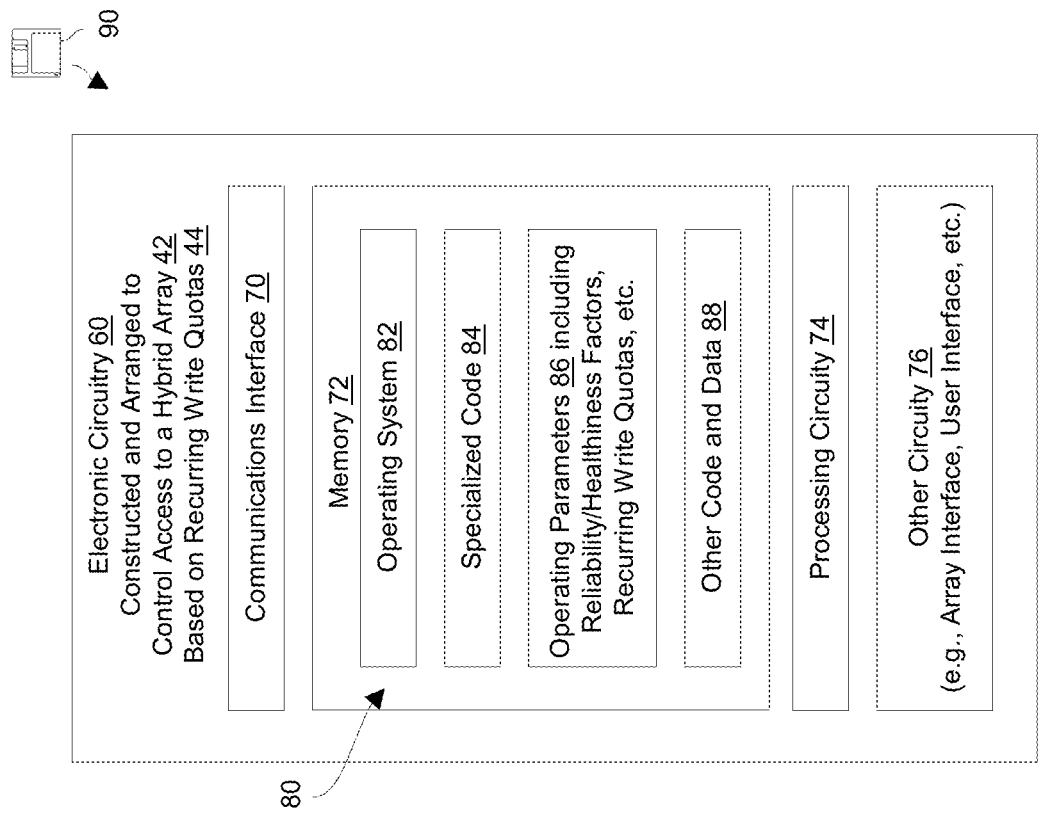
FIG. 2 is a block diagram of data storage equipment of the data storage environment of FIG. 1 in accordance with certain example embodiments.

FIG. 2 shows an electronic circuitry 60 which is suitable for the storage processing circuitry 40 that controls access to the hybrid array 42 based on recurring write quotas 48 in accordance with certain example embodiments (also see FIG. 1). As shown in FIG. 2, the electronic circuitry 60 includes a communications interface 70, memory 72, processing circuitry 74, and other circuitry 76.

The communications interface 70 is constructed and arranged to connect the data storage equipment 24 to the communications medium 26 (FIG. 1) to enable electronic communications with other devices of the data storage environment 20 (e.g., the host computers 22). Such communications may be SAN-based, IP-based, cellular-based, cable-based, fiber-optic based, wireless, cloud-based, combinations thereof, and so on. Accordingly, the communications interface 70 enables the data storage equipment 24 to robustly and reliably communicate with other apparatus.

The memory 72 is intended to represent both volatile storage (e.g., DRAM, SRAM, etc.) and non-volatile storage (e.g., flash memory, magnetic memory, etc.). In some arrangements, the memory 72 utilizes a portion of the hybrid array 42 (FIG. 1). The memory 72 stores a variety of software constructs 80 including operating system code 82, specialized code 84, operating parameters 86, as well as other code and data 88.

The operating system code 82 refers to an operating system which is involved in controlling various electronic resources of the data storage equipment 24. Along these lines, the operating system manages/allocates various electronic resources such as processor cycles, memory space, application installations, access control and privileges, and so on.

The specialized code 84 refers to the instructions that are involved in data storage operations (e.g., write and read operations) as well as other operations such as using recurring write quotas 48 to optimize utilization of solid state storage in the hybrid array 42. The specialized code 84 may include operating variables and data structures, drivers, other metadata, etc. that form one or more portions of the I/O stack, mapping tables, and so on. In some arrangements, the specialized code 84 is tightly integrated with the operating system code 82 (e.g., a kernel).

The operating parameters 86 refer to reliability/healthiness factors, rules that guide remedial activities, the recurring write quotas 48, evaluation results, and so on. At least some of the operating parameters 86 may be predefined prior to electronic circuitry operation while other operating parameters 86 are generated and updated over time during electronic circuitry operation.

The other code and data 88 refers to various other instructions, parameters, data, etc. For example, the electronic circuitry 60 may be equipped with other tools and utilities, user-level applications, and so on.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that concurrently carries out data storage operations as well as uses recurring write quotas 48 to optimize utilization of solid state storage in the hybrid array 42.

Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 76 represents additional hardware. For example, the other circuitry 76 may include a storage drive (or array) interface to communicate with the SSD storage components 46, HDDs, and so on (e.g., via SATA, SAS, PCIe, etc.). As another example, the other circuitry 76 may include a user terminal or service processor that enables a human user to control and/or configure the data storage equipment 24, and so on. Further details will now be provided with reference to FIGS. 3 and 4.

Figure 3:
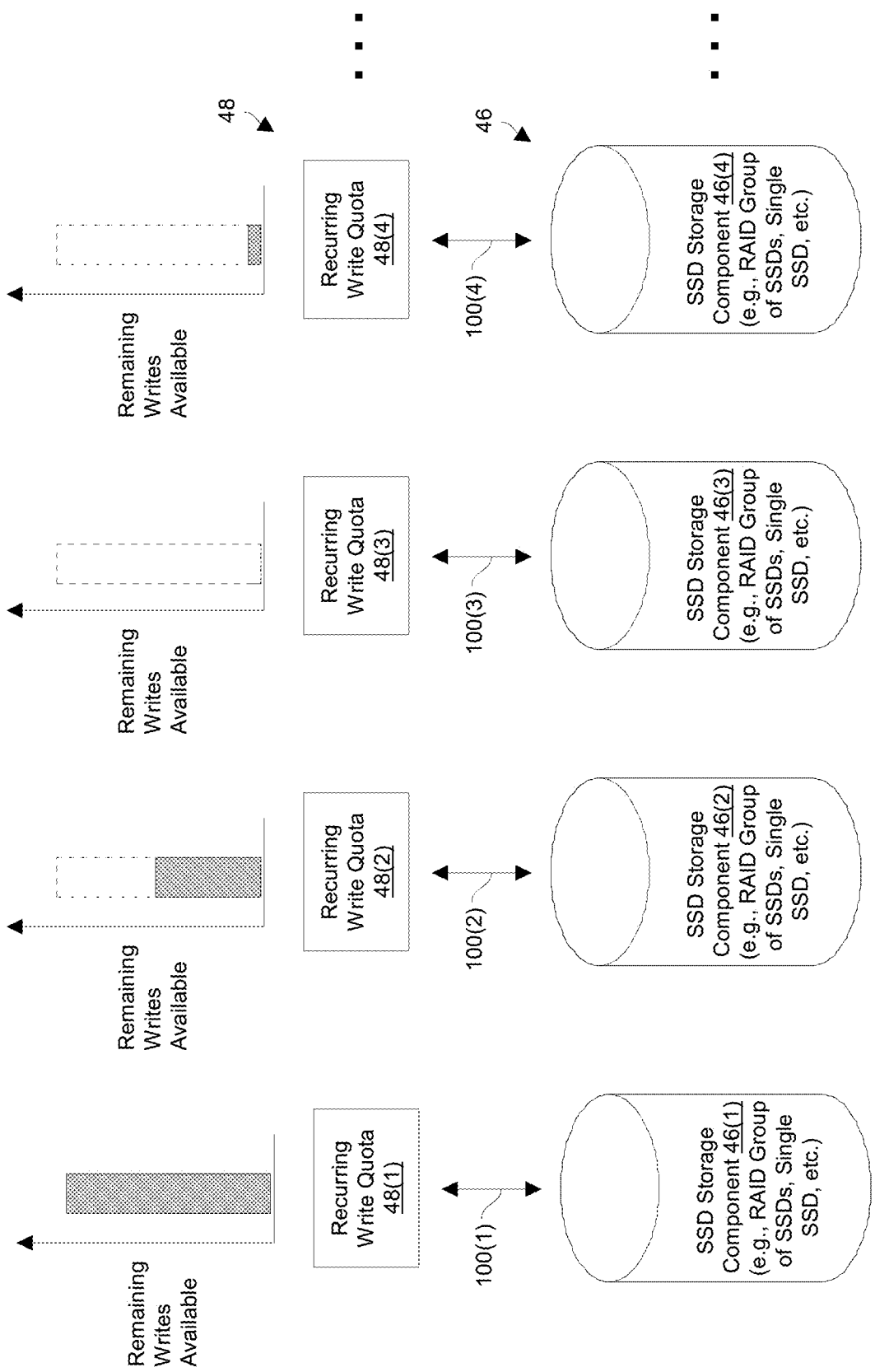
FIG. 3 is a block diagram illustrating particular recurring write quota details in accordance with certain example embodiments.
Figure 4:
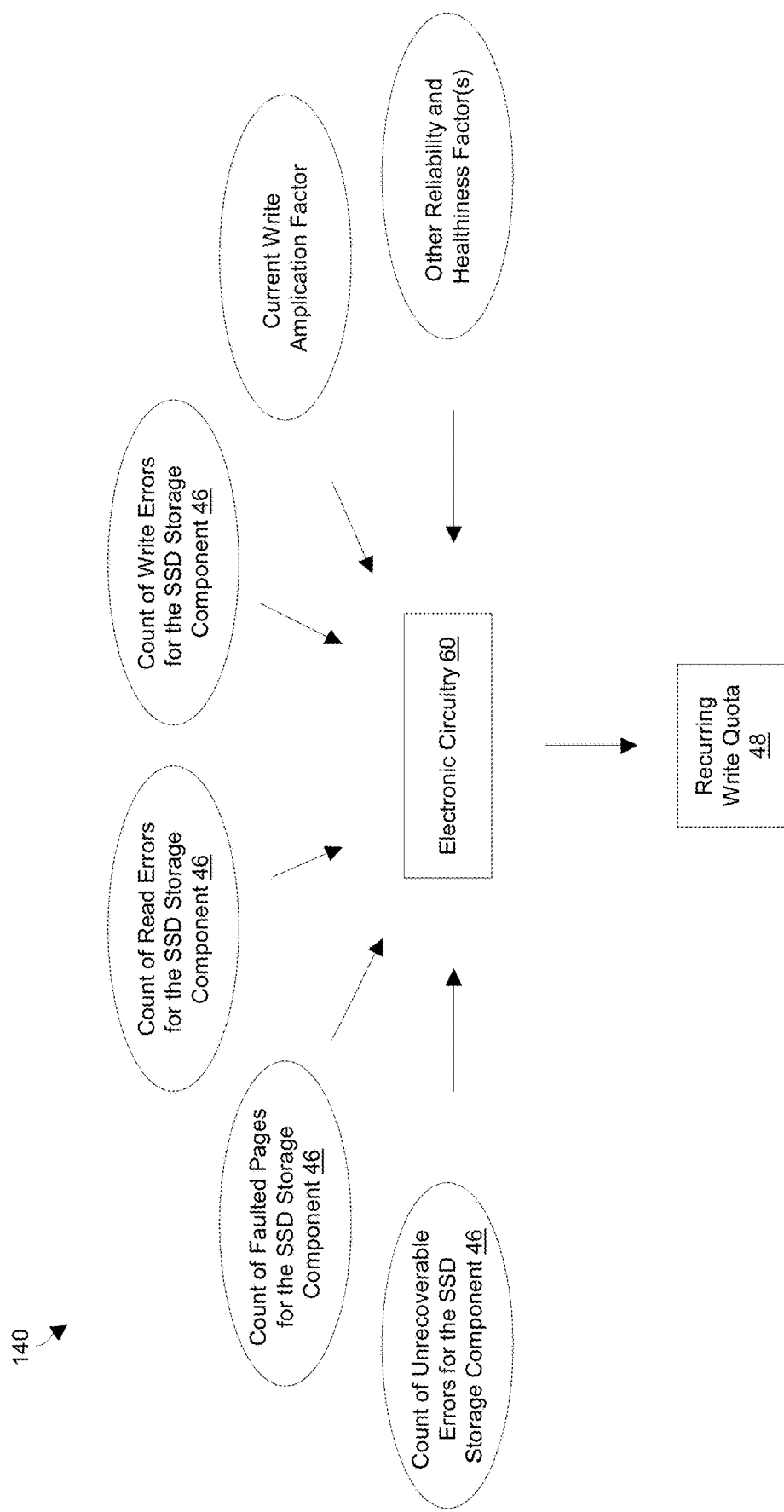
FIG. 4 is a block diagram illustrating other particular recurring write quota details in accordance with certain example embodiments.

FIGS. 3 and 4 show particular recurring write quota details in accordance with certain example embodiments. FIG. 3 shows the relationship between the recurring write quotas 48 and the SSD storage components 46 of a particular storage tier 44. FIG. 4 shows how the recurring write quotas 48 are generated (or derived) for the SSD storage components 46.

As shown in an example situation in FIG. 3, the electronic circuitry 60 maintains a recurring write quota 48 for each SSD storage component 46. The correspondences between the write quotas 48 and the SSD storage components 46 are illustrated by the arrows 100(1), 100(2), 100(3), 100(4), . . .

As mentioned earlier, each SSD storage component 46 includes at least one solid state device. In some situations, a SSD storage component 46 includes multiple SSDs configured as a RAID group that provide additional fault tolerance (e.g., the ability to recover or reconstruct data that was stored on a failed SSD). In some arrangements, a SSD storage component 46 includes a single SSD (e.g., where all of the circuitry that forms the SSD resides within a single chassis, package, or housing).

At this point, one should appreciate that SSDs have limits to number of times they can be written. Such limits may be specified by the SSD manufacturer as the number of program-erase (PE) cycles that the pages of the SSDs are able to perform (or withstand) before the SSDs are no longer confidently writable. For example, the manufacturer for a particular single-level cell (SLC) SSD may specify that each page of the particular SLC SSD is able to perform between 90,000 to 100,000 PE-cycles. As another example, the manufacturer for a particular enterprise multi-level cell (eMLC) SSD may specify that each page of the particular eMLC SSD is able to perform between 20,000 to 30,000 PE-cycles. As yet another example, the manufacturer for a standard multi-level cell (MLC) SSD may specify that each page of the standard MLC SSD is able to perform around 10,000 PE-cycles, and so on. One should further appreciate that the specified number of PE-cycles may vary from one manufacturer or vender to another, and may be based on actual test results.

It should be further understood that the recurring write quotas 48 may be based, at least in part, on the specified number of PE-cycles. For example, suppose that each SSD storage component 46 is an individual eMLC SSD having pages that are spec'd to perform 20,000 PE-cycles. Further suppose that the operator of the data storage equipment 24 plans to utilize the SSD storage components 46 for 5 years. In such a situation, each SSD storage component 46 may support an average of 4,000 PE-cycles per year (or just under 11 PE-cycles per day). Also suppose that the operator understands that, due to write amplification, each write to an SSD storage component 46 typically results in twice as many writes and thus discounts the number of PE-cycles per day from 11 PE-cycles per day to 5 PE-cycles per day.

With these characteristics in mind, the operator may specify a maximum recurring write quota of 5 PE-cycles per day for each SSD storage component 46 that exhibits normal error behavior. The operator may further specify a higher maximum recurring write quota of 10 PE-cycles per day for each SSD storage component 46 that exhibits little or no error behavior. In some arrangements, the operator may even set the recurring write quotas of certain "exceptional" SSDs that experience little or no faulty behavior so that their operative lifetime will exceed manufacturer specifications, e.g., allow up to six times the number of PE-cycles that causes the "exceptional" SSDs to reach their prescribed lifetime.

Accordingly and as shown in FIG. 3, the electronic circuitry 60 maintains respective recurring write quotas 48 for the SSD storage components 46. In particular, the recurring write quota 48(1) is a numerical measure (or budget) of remaining PE usefulness for the SSD storage component 46(1). Similarly, the recurring write quota 48(2) is a numerical measure of remaining PE usefulness for the SSD storage component 46(3). Likewise, the recurring write quota 48(3) is a numerical measure of remaining PE usefulness for the SSD storage component 46(3), and the recurring write quota 48(4) is a numerical measure of remaining PE usefulness for the SSD storage component 46(4), and so on.

It should be understood that the recurring write quotas 48 are write allocations for writes to the same page for a given period of time. Suitable periods of time include 30 minutes, an hour, a day, a week, among others. For example, for a particular SSD storage component 46, the electronic circuitry 60 may initially allocate (or set) a recurring write quota 48 to 10 PE-cycles per day. Then, the electronic circuitry 60 updates the recurring write quota 48 for the particular SSD storage component 46 as the electronic circuitry 60 puts the particular SSD storage component 46 through PE-cycles during that day. Accordingly, after each page of the particular SSD storage component 46 has been written to say 3 times in a particular day, the recurring write quota 48 that was initially 10 is now 7 for that SSD storage component 46 during that day (i.e., the recurring write quota 48 has been reduced by 3). Looked at another way, the number of page write cycles performed within that day has increased from 0 to 3 and is now closer to the quota threshold of 10 (i.e., there are 7 more PE-cycles allowed for the particular SSD storage component 46 during that day).

Eventually, the recurring write quota 48 for that SSD storage component 46 may be fully consumed. At this point, the electronic circuitry 60 performs a remedial action such as providing an alert to the operator (or user) indicating that the SSD storage component 46 is being fully utilized. In some arrangements, the electronic circuitry 60 does not block further write cycles by the particular SSD storage component 46 and the alert simply operates as an indicator that the SSD storage component 46 will reach its specified number of PE-cycles earlier than planned. Alternatively, when the recurring write quota 48 for that SSD storage component 46 has been fully consumed, the electronic circuitry 60 may block further writes to that SSD storage component 46 and satisfy further writes during that day by directing the writes to other storage thus preventing excessive wear and over-utilization of the particular SSD storage component 46.

By way of example only and as shown in FIG. 3, the recurring write quotas 48(1), 48(2), 48(3), 48(4), . . . show the remaining PE-cycle budgets left for the SSD storage components 46(1), 46(2), 46(3), 46(4), . . . . It should be understood that the number of PE-cycles performed by each SSD storage components 46 of the data storage equipment 24 may vary since the SSD storage components 46 may store different data and may be accessed by different hosts, applications, etc.

In particular, the recurring write quota 48(1) for the SSD storage component 46(1) is not consumed at all. This may mean that the electronic circuitry 60 has not performed any PE-cycles on the SSD storage component 46(1) yet during the current time period (e.g., the current day).

Additionally, the recurring write quota 48(2) for the SSD storage component 46(2) is half consumed meaning that the allocated number of writes-cycles for the SSD storage component 46(2) has been half consumed and there is another half that is unconsumed for further PE-cycles for the rest of the current time period (e.g., the rest of the current day).

Furthermore, the recurring write quota 48(3) for the SSD storage component 46(3) is fully consumed meaning that there are no PE-cycles left in the budget for the SSD storage component 46(3) for the current time period. In this situation, the electronic circuitry 60 performs a remedial action such as alerting the operator, blocking further write operations to the SSD storage component 46(3) for the rest of the current time period, combinations thereof, etc. For example, any write operations that were directed to the SSD storage component 46(3) during the current time period (i.e., while the recurring write quota 48(3) remains fully consumed) may be steered to the SSD storage component 46(1) until the current time period expires.

Also, the recurring write quota 48(4) for the SSD storage component 46(4) is mostly consumed meaning that there are not many PE-cycles left in the budget for the SSD storage component 46(4). In some arrangements, the electronic circuitry 60 may provide an alert and/or re-direct writes to different SSD storage component 46 even if the recurring write quota 48 is not fully consumed.

It should be understood that once the current time period has expired, the electronic circuitry 60 resets or re-initializes the recurring write quota 48 for each SSD storage component 46 to the full recurring write quota 48. At this time, if writes had been blocked to certain SSD storage components 46 because their recurring write quotas 48 had been fully consumed during the earlier time period, the writes may now be unblocked thus again re-enabling writes to those SSD storage components 46.

The electronic circuitry 60 may reset the recurring write quotas 48 and repeat this process routinely (e.g., daily) thus enabling the data storage equipment 24 to more evenly wear the SSD storage components 46. Moreover, any alerts to the operator enables the operator to modify how the SSD storage components 46 to improve the ability of the SSD storage components 46 to safely reach the planned lifetime before reaching the PE-cycle limits.

As shown in FIG. 4, the electronic circuitry 60 derives the recurring write quota 48 for each SSD storage component 46 based on a variety of reliability and healthiness factors 140. Such reliability and healthiness factors 140 may include but are not limited to (i) a count of unrecoverable errors for each SSD storage component of the set of SSD storage components, (ii) a count of faulted pages for each SSD storage component of the set of SSD storage components, (iii) a count of read errors for each SSD storage component of the set of SSD storage components, (iv) a count of write errors for each SSD storage component of the set of SSD storage components, and (v) a current write amplification factor for each SSD storage component of the set of SSD storage components, combinations thereof, and so on. Other factors are suitable for use as well such as knowledge of how soon the SSD storage components will be replaced, knowledge of whether the SSD storage component 46 stores host data, metadata, applications, a database, and so on.

One should appreciate that the degree of write amplification that occurs within SSDs may be based on how particular write patterns affect certain operations such as wear leveling, garbage collection, etc. Accordingly, the amount (or degree) of write amplification may be considered a factor that affects SSD reliability/health due to its impact on SSD wear.

It should be understood that the internal circuitry of an SSD may sense, track, tally, and operate based on a variety of criteria. In traditional SSDs, some of this criteria may not normally be made available externally (e.g., for querying by external circuitry). However, such SSDs may easily be adapted to output such criteria for use by external circuitry to enable more effective wear leveling among SSDs using the recurring write quotas 48 disclosed herein.

It should be further understood that the recurring write quota 48 that the electronic circuitry 60 (FIG. 2) generates for one SSD storage component 46 may be significantly different than the recurring write quota 48 that the electronic circuitry 60 generates for another SSD storage component 46. For example, for a "healthy" or "exceptional" SSD storage component 46 that exhibits little or no faults, the electronic circuitry 60 may provide a relatively high recurring write quota 48 such as 10 or 20 write-cycles per day. On the other hand, for an "unhealthy" SSD storage component 46 that exhibit many faults, the electronic circuitry 60 may provide a relatively low recurring write quota 48 such as 3 write-cycles per day, and so on. Further details will now be provided with reference to FIG. 5.

Figure 5:
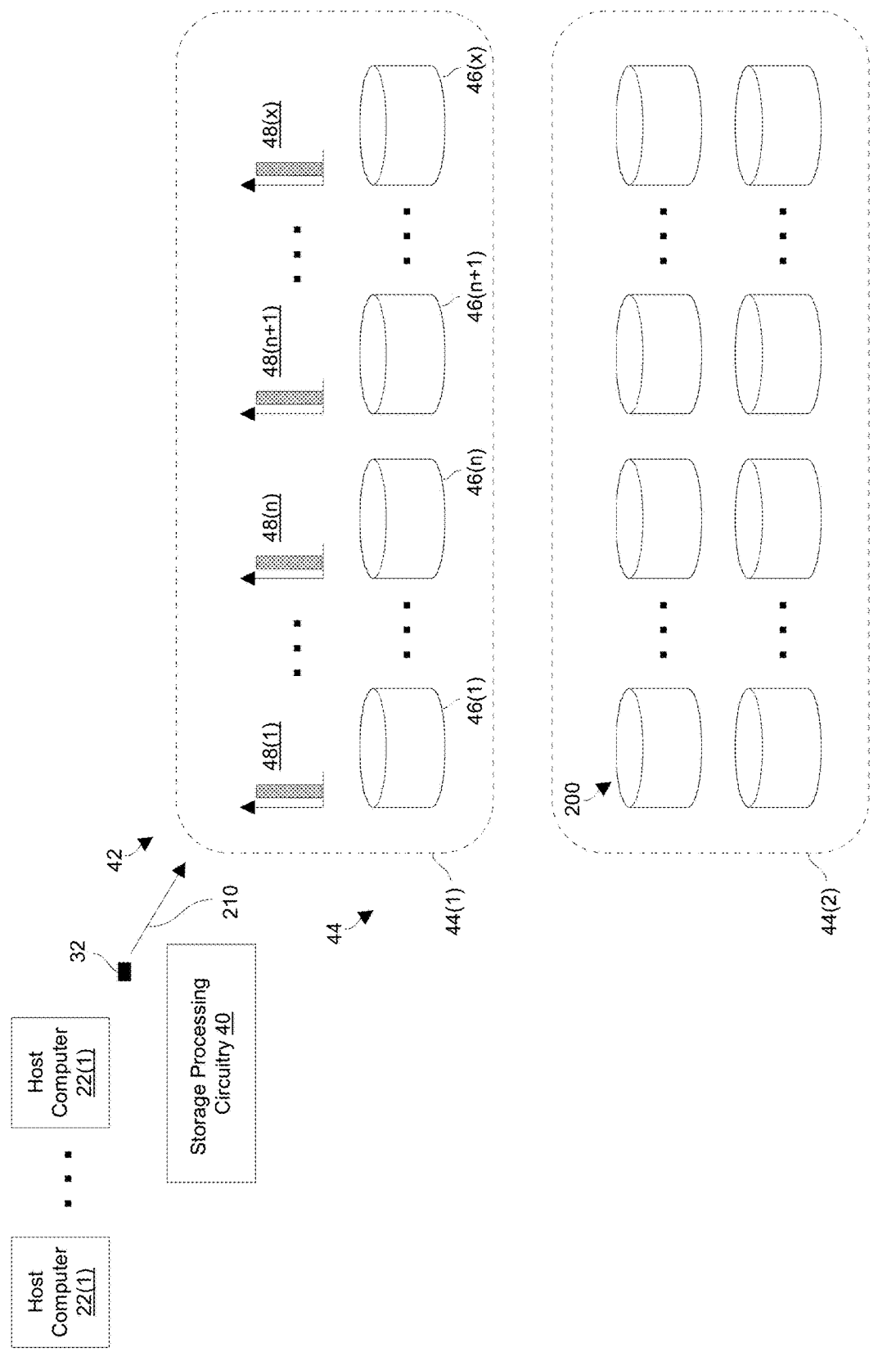
FIG. 5 is a block diagram illustrating, in accordance with certain example embodiments, a first set of activities that are performed by the data storage environment when a write quota is fully consumed.
Figure 6:
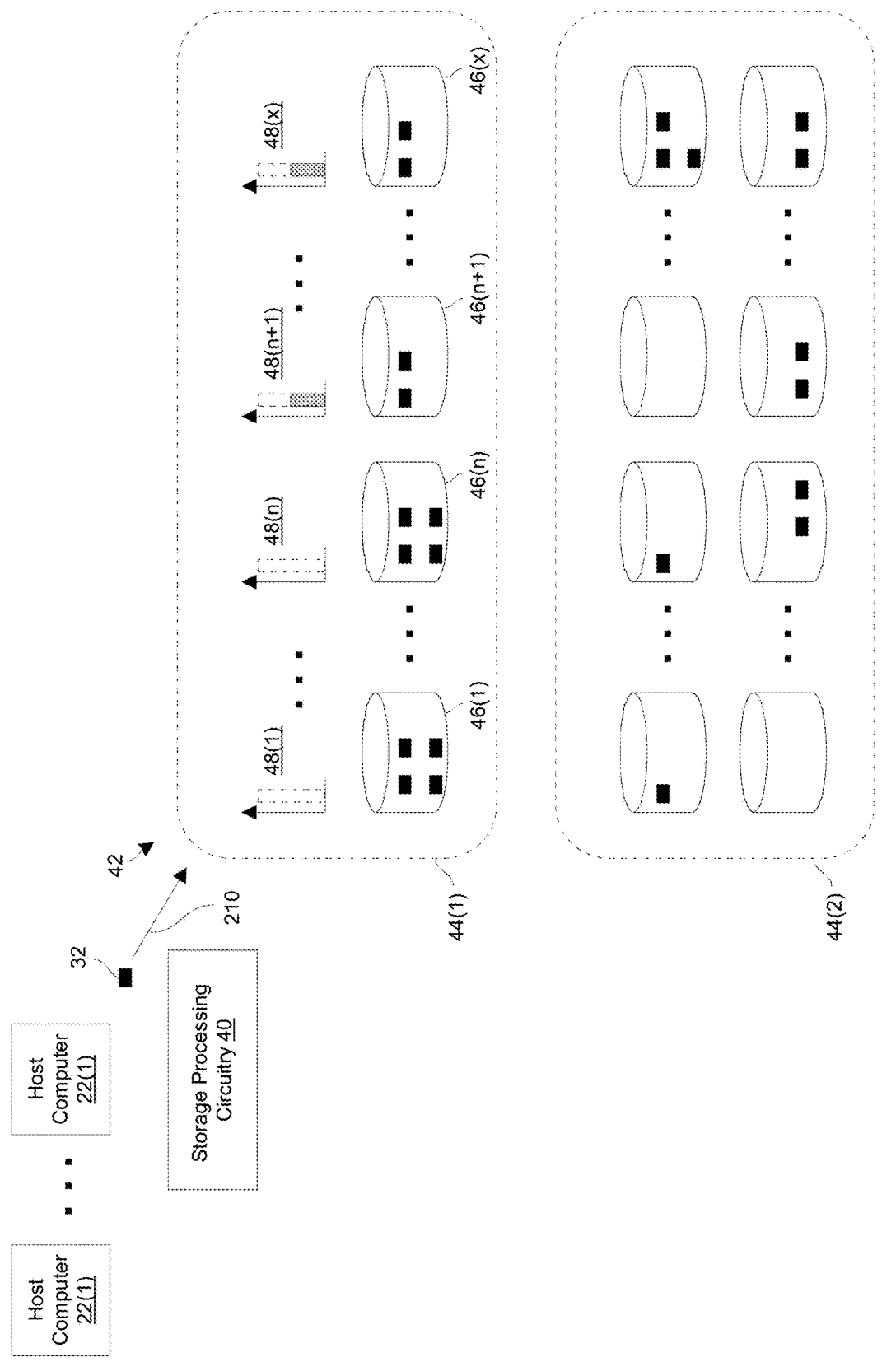
FIG. 6 is a block diagram illustrating, in accordance with certain example embodiments, a second set of activities that are performed by the data storage environment when a write quota is fully consumed.

FIGS. 5 and 6 illustrate a particular example involving use of recurring write quotas 48 to optimize utilization of solid state storage in a hybrid storage array 42 in accordance with certain embodiments. As shown, the hybrid storage array 42 includes a SSD storage tier 44(1) having SSD storage components 46, and a HDD storage tier 44(2) having magnetic disk devices 200. By way of example, the HDD storage tier 44(2) is shown as having a different number of storage devices to illustrate that the number of devices and capacities between storage tiers 44 may be different. Moreover, it should be clear that the hybrid storage array 42 may include additional storage tiers 44 such as other SSD storage tiers 44 (e.g., other SSD storage tiers 44 formed of SSDs of a different types, capacities, etc.) and/or other HDD storage tiers 44 (e.g., other HDD storage tiers 44 formed of HDDs of different speeds, capacities, etc.).

As further shown in FIG. 5, the storage processing circuitry 40 manages respective recurring write quotas 48 for the SSD storage components 46. That is, the storage processing circuitry 40 manages a recurring write quota 48(1) for the SSD storage component 46(1), a recurring write quota 48($n$) for the SSD storage component 46($n$), a recurring write quota 48($n$+1) for the SSD storage component 46($n$+1), a recurring write quota 48($x$) for the SSD storage component 46($x$), etc.

During operation and as shown in FIG. 5, the storage processing circuitry 40 initializes each recurring write quota 48 to full value at the beginning of a current time period such as a week, a day, an hour, etc. (other time periods being suitable as well). In one example, each recurring write quota 48 may initially be some number of megabytes per time period (e.g., 10 MB per day, per hour, etc.). In another example, each recurring write quota 48 may initially be some number of PE-cycles per time period (e.g., 10 PE-cycles per day, etc.).

When the storage processing circuitry 40 writes data (arrow 210 in FIG. 5) to a particular SSD storage component 46 during a current time period, the storage processing circuitry 40 consumes the write quota 48 for that SSD storage component 46. As long as the write quota 46 for that SSD storage component 46 is not fully consumed during the current time period, the storage processing circuitry 40 allows further data to be written to that SSD storage component 46 during the remainder of the current time period. However, if the write quota 46 for that SSD storage component 46 becomes fully consumed, the storage processing circuitry 40 blocks further data from being written to that SSD storage component 46 until the end of the current time period. After the current time period expires, the storage processing circuitry 40 resets any partially or fully consumed write quotas 48 to their full value for write quota consumption during a new time period.

FIG. 6 shows, by way of example, the hybrid array 42 after some amount of time has passed during a current time period. Here, the storage processing circuitry 40 has written so much data to the SSD storage components 46(1), . . . , 46($n$) during the current time period that the storage processing circuitry 40 has fully consumed the respective recurring write quotas 48(1), . . . 48($n$). As further shown in FIG. 6, the storage processing circuitry 40 has written so some data to the SSD storage components 46($n$+1), . . . , 46($x$) during the current time period so that the respective recurring write quotas 46($n$+1), 46($x$) are partially consumed. The storage processing circuitry 40 may have written some data to the HDD storage tier 44(2) as well. Also, the storage processing circuitry 40 may read data from the storage tiers 44.

Since the write quotas 48(1), . . . 48(*n*) have been fully consumed as shown in FIG. 6, the storage processing circuitry 40 prevents further data from being written to the SSD storage components 46(1), . . . , 46(*n*) during the remainder of the current time period. However, since write quotas 48(*n*+1), . . . 48(*x*) have not been fully consumed, the storage processing circuitry 40 allows further data to be written to the SSD storage components 46(*n*+1), . . . , 46(*x*) during the remainder of the current time period.

By way of example, suppose that the storage processing circuitry 40 has further data to write to the SSD storage components 46(1), . . . , 46(*n*) during the remainder of the current time period even though the write quotas 48(1), . . . 48(*n*) have been fully consumed. In this situation, the storage processing circuitry 40 does not write the data to the SSD storage components 46(1), . . . , 46(*n*) but instead performs a set of remedial actions. For example, the storage processing circuitry 40 may write that data to one or more of the other SSD storage components 46(*n*+1), . . . , 46(*x*). As another example, the storage processing circuitry 40 may write that data to the magnetic disk drives 200 of the HDD storage tier 44(2). Other operations may be performed as well such as moving data at rest to other locations to reduce the write demand to certain SSD storage components 46 in the future, and so on.

Such operation balances wearing of the SSD storage components 46, and enables the SSD storage components 46 to reach their optimum lifespan. That is, the storage processing circuitry 40 uses the recurring write quotas 48 to pace (or regulate) usage of the SSD storage components 46 so the SSD storage components 46 are not overly worn prematurely. Without such operation, utilization of the SSD storage components 46 may become grossly uneven and some SSD storage components 46 could become overused and require replacement too soon (i.e., ahead of schedule).

It should be understood that, initially, the recurring write quotas 48 may be the same and set at some standard amount. For example, if each SSD storage component 46 is expected to last 10,000 PE-cycles and the operator desires each SSD storage component 46 to last at least 1,000 days, initially the storage processing circuitry 40 may set the write quota 48 for each SSD storage component 46 to be 10 PE-cycles per day.

However, over time, the storage processing circuitry 40 monitors the operation of each SSD storage component 46 and may adjust the write quotas 48 based on healthiness indicators. That is, due to variations in each SSD storage component 46, some SSD storage components 46 may provide higher than average errors (write faults, read faults, etc.), average errors, below average errors, and so on. For each SSD storage component 46 that exhibits higher than average errors, the storage processing circuitry 40 may reduce the respective recurring write quota 48 since that SSD storage component 46 could prematurely fail. Additionally, for each SSD storage component 46 that exhibits an average number of errors, the storage processing circuitry 40 may maintain the respective recurring write quota 48 as initially set or perhaps make minor adjustments based on factors such as the actual number of PE-cycles used by that SSD storage component 46. Furthermore, for each SSD storage component 46 that exhibits lower than average errors, the storage processing circuitry 40 may increase the respective recurring write quota 48 since that SSD storage component 46 may exhibit a life significantly higher than what is even prescribed by the SSD manufacturer.

By way of example only, the storage processing circuitry 40 routinely queries each SSD storage component 46 for a set of healthiness factors 140 (also see FIG. 4) to periodically adjust the write quotas 48. The storage processing circuitry 40 may algorithmically generate a healthiness indicator for each SSD storage component 46 based on metrics such as the total number of write errors and/or the total number of read errors since the beginning of operation or since the SSD storage component 46 was last queried. Along these lines, the storage processing circuitry 40 may calculate a score and then compare the score to a set of predetermined thresholds. Equation (1) below is suitable for use.

$$\text{Score} = \text{Number of Write Errors} + \frac{\text{Number of Write Errors}}{2} \qquad (1)$$

If the score is greater than a first threshold that identifies unhealthy SSD storage components 46, the storage processing circuitry 40 considers the SSD storage component 46 to be "unhealthy". However, if the score is less than the first threshold that identifies unhealthy SSD storage components 46 and is above a second threshold that identifies exceptional SSD storage components 46, the storage processing circuitry 40 considers the SSD storage component 46 "normal". Furthermore, if the score is lower than the second threshold that identifies exceptional SSD storage components 46, the storage processing circuitry 40 considers the SSD storage component 46 "exceptional" (or above average).

Based on the healthiness indicator of each SSD storage component 46, the storage processing circuitry 40 generates a new write quota 48 for that SSD storage component 46. For example, if the storage processing circuitry 40 considers the SSD storage component 46 to be "unhealthy", the storage processing circuitry 40 may set a relatively low value for the remaining lifetime of that SSD storage component 46 (e.g., a low number of remaining PE-cycles for that SSD storage component 46). However, if the storage processing circuitry 40 considers the SSD storage component 46 to be "healthy", the storage processing circuitry 40 may set a relatively normal value for the remaining lifetime of that SSD storage component 46 (e.g., a normal or average number of remaining PE-cycles for that SSD storage component 46). Moreover, if the storage processing circuitry 40 considers the SSD storage component 46 to be "exceptional", the storage processing circuitry 40 may set a relatively high value for the remaining lifetime of that SSD storage component 46 (e.g., a high number of remaining PE-cycles for that SSD storage component 46). Equation (2) below is suitable for use.

$$\text{Write Quota} = \frac{\text{Number of Remaining } PE\text{-Cycles}}{\text{Amount of Lifetime Remaining}} \qquad (2)$$

In some arrangements, the storage processing circuitry 40 may even set the number of remaining PE-cycles to a value that exceeds the manufacturer's specification. Along these lines, recall that it has been observed that very well manufactured SSD storage components 46 by several times their specified lifetimes (e.g., 2 times, 3 times, 6 times, etc.).

It should be understood that the storage processing circuitry 40 re-performs scoring (e.g., Equation (1)) and write quota evaluation (e.g., Equation (2)) for each SSD storage component 46 over time. Such continuous monitoring of SSD health (e.g., PE-cycles, errors, etc.) enables the operation of the data storage equipment 24 to adapt to various situations such as changes in write behavior by the host computers 22. For example, during operation, the operators of the host computers 22 may move data (e.g., files, file systems, LUNs, volumes, RAID groups, etc.), change or augment applications/behavior/usage patterns/etc. that effect the manner in which the SSD storage components 46 are used. Accordingly, such continuous monitoring enables the data storage equipment 24 to adjust its operation accordingly to maintain efficient usage of solid state storage.

In accordance with some embodiments, the storage processing circuitry 40 contemporaneously collects statistics on how particular data extents (e.g., slices, blocks, etc.) are accessed over time. With such information available, the storage processing circuitry 40 is able to predict the amount of data that is expected to be written to each data extent (e.g., the number of bytes that will be written to each slice in the next hour). Accordingly, in certain situations and during a particular time period, the storage processing circuitry 40 may intelligently perform a data placement such as write data to the particular data extents residing on the SSD storage components 46 until their write quotas 48 are reach, and then write the remaining data somewhere else (e.g., the HDD tier 44(2) in FIG. 6). Such operation enables optimal utilization and preservation of the solid state storage. Further details will now be provided with reference to FIG. 7.

Figure 7:
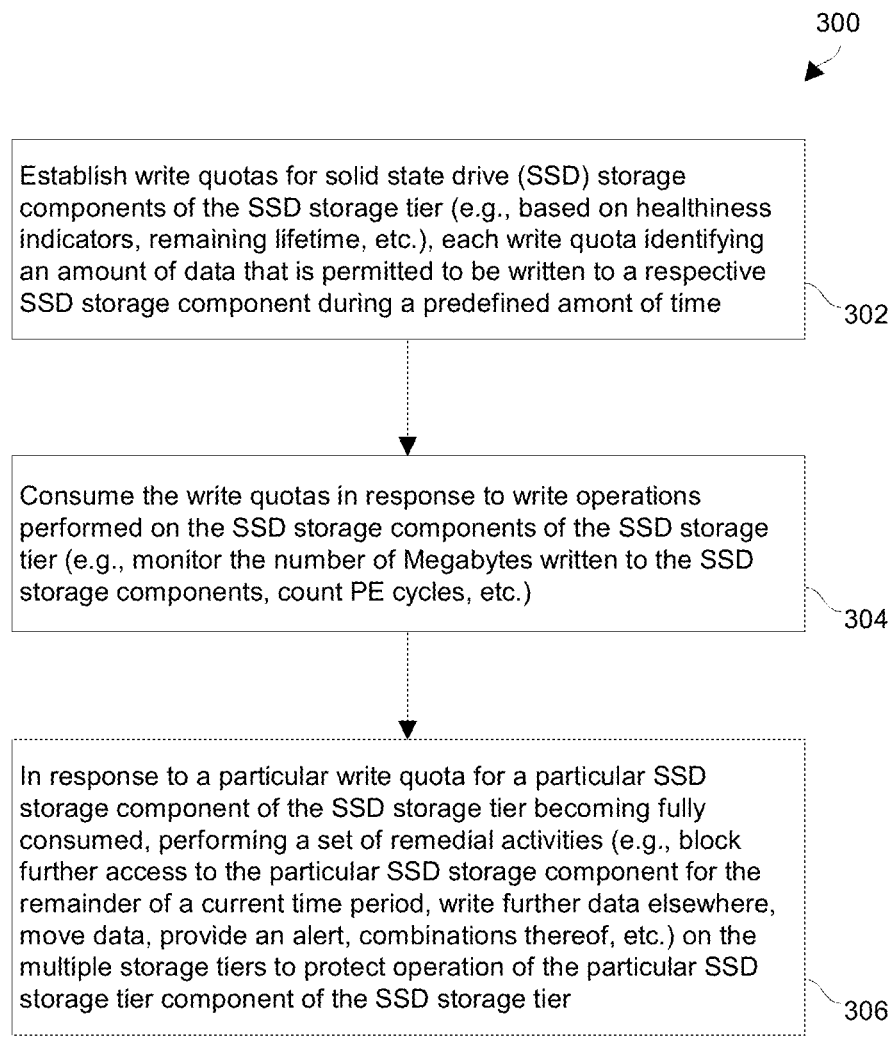
FIG. 7 is a flowchart of a procedure which is performed by the data storage equipment of FIG. 2.

FIG. 7 is a flowchart of a procedure 300 which is performed by control circuitry, to operate multiple data storage tiers including a SSD storage tier having SSD storage components and a HDD storage tier having magnetic disk devices. The procedure 300 uses recurring write quotas to optimize utilization of solid state storage in a hybrid storage array (e.g., also see FIG. 1).

At 302, the control circuitry establishes (or sets) write quotas for the SSD storage components of the SSD storage tier. Each write quota identifies an amount of data that is permitted to be written to a respective SSD storage component during a predefined amount of time. As mentioned earlier, the values of the write quotas may differ from one SSD storage component to another and be based on current healthiness (e.g., healthiness indicators), remaining lifetime, etc.

At 304, the control circuitry consumes the write quotas in response to write operations performed on the SSD storage components of the SSD storage tier. As mentioned earlier, example units for the write quotas include actual data (e.g., Megabytes) and PE-cycles, among others.

At 306, the control circuitry performs, in response to a particular write quota for a particular SSD storage component of the SSD storage tier becoming fully consumed, a set of remedial activities on the multiple storage tiers to protect operation of the particular SSD storage component of the SSD storage tier. Along these lines, the control circuitry may block further data from being written to the particular SSD storage component until the predefined amount of time expires (i.e., until after the current time period is over).

The control circuitry may repeat the procedure 300 upon expiration of the predefined amount of time. In particular, the control circuitry re-establishes (or resets) the write quotas for the SSD storage components of the SSD storage tier at 302 and then repeats 304 and 306.

As mentioned above, an improved technique is directed to using recurring write quotas 48 to optimize utilization of solid state storage in a hybrid storage array 42. Such recurring write quotas 48 are allocated budgets for write operations for a given time period and may be based on a variety of measured (or counted) reliability and/or healthiness factors. Example factors include the number of read errors, the number of write errors, the number of unrecoverable errors, the number of faulted pages, write amplification metrics, and so on. Moreover, when a write quota 48 has been consumed for a particular solid state drive (SSD) storage component 46, control circuitry may automatically perform a remedial activity such as block further write operations to that SSD storage component 46 for an amount of time, direct at least some write operations to an alternative SSD storage component 46 to provide even wearing or to a hard disk drive (HDD) storage tier 44 having magnetic disk devices, move data within the same storage tier or between storage tiers 44, alert a user, combinations thereof, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, in some arrangements, a SSD storage component 46 includes multiple SSDs. In these arrangements, the electronic circuitry 60 may take, as the reliability and healthiness factors (also see FIG. 4) for the SSD storage component 46, the worst factor of all of the SSDs.

One should appreciate that the above-described techniques do not merely store data in SSDs. Rather, the disclosed techniques involve improvements to the technology. Along these lines, with the above-described techniques, the data storage equipment 24 is able to control wear among SSDs. Moreover, the data storage equipment 24 is able to identify which SSDs are healthy and extend the useful life of the healthy SSDs beyond the prescribed PE-cycles that are provided for worst case, unhealthy SSDs. Other advantages are available as well such as dynamic adjustments made to the data storage equipment in response to changing SSD behaviors, and so on.

It should be understood that a thin LUN involves mapping different regions of its address space to different regions of the physical space available from the drives (RAID groups) provisioned to the array. Additionally, an application may access the different parts of this logical space, but not equally. Rather, there may be spatial and temporal localities for such access over the time. Therefore, in the general case, the amount of IOs coming to the different regions of the physical space and the corresponding drives is not even as well. Instead, it can be different in the amount of operations, in the nature of the operations (reads, writes or some mixture of reads and writes), block size, etc.

Furthermore, flash memory drives should sustain the vendor-specified number of writes cycles throughout their life time. It is expected that SSDs are going to fail soon after that. This maximum number depends on the used technology and there is a trend to use flash memory drives with less number of supported writes per day. Thus the drives, which hold the physical regions of space mapped to the logical regions with higher write rate, could be worn out before the end of their warranty period, which is not good. In fact, it is undesirable for SSDs to fault prematurely and somewhat useful to use drive endurance as the measure of its faultiness. Unfortunately, conventional wear balancing techniques tackle this issue only indirectly. Moreover maximum number of cycles is set by the SSD vendor for the worst case for all the drives of the same type. However, there are recent studies showing that in reality this number is 3 times higher at least.

In contrast, certain embodiments disclosed herein utilize recurring write quotas based on faultiness to avoid drive failure. Such utilization may prevent drives from failing during their warranty period directly or even beyond their warranty period, and adapts to the different endurance and reliability characteristics of the drives naturally. In particular, circuitry monitors the faultiness/reliability characteristic for every SSD or SSD group. Such characteristics can be obtained from the parameters of the SSD (e.g., reading status from the SSD). Examples of such SSD health data include the number of faults of different types, age and other parameters impacting the reliability of the drive, and so on. The circuitry then calculates the correlation between number of written bytes to the drive and the corresponding increase in the faultiness (as endurance is the main factor in the reliability). Having a faultiness threshold (after which the drive is considered to be failed finally) and the period of time desired for the drive to operate in service, the recurring write quota can be calculated.

Accordingly, the recurring write quota limits the amount of allowed writes to the drive, i.e., the circuitry prevents the drive from exceeding its write quota. As a result, no drive in the array will fail before the end of the warranty period.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of operating multiple data storage tiers including a solid state drive (SSD) storage tier having SSD storage components and a hard disk drive (HDD) storage tier having magnetic disk devices, the method comprising:
   establishing write quotas for the SSD storage components of the SSD storage tier, each write quota identifying an amount of data that is permitted to be written to a respective SSD storage component during a predefined amount of time;
   consuming the write quotas in response to write operations performed on the SSD storage components of the SSD storage tier; and
   in response to a particular write quota for a particular SSD storage component of the SSD storage tier becoming fully consumed, performing a set of remedial activities on the multiple storage tiers to protect operation of the particular SSD storage component of the SSD storage tier;
   wherein each of the SSD storage components of the SSD storage tier has a respective pre-specified program-erase cycle lifetime limit; and
   wherein the method further comprises:
   while consuming the write quotas for the SSD components of the SSD storage tier, writing data to particular SSD storage components of the SSD storage tier after the respective pre-specified program-erase cycle lifetime limits of the particular SSD storage components have been exceeded.

2. A method as in claim 1 wherein performing the set of remedial activities on the multiple storage tiers includes:
   in response to the particular write quota for the particular SSD storage component of the SSD storage tier becoming fully consumed, blocking further write instructions to the particular SSD storage component of the SSD storage tier during the predefined amount of time to prevent the particular SSD storage component from performing further write operations during the predefined amount of time.

3. A method as in claim 2 wherein performing the set of remedial activities on the multiple storage tiers further includes:
   while the further write instructions to the particular SSD storage component are being blocked, processing the further write instructions on a set of other SSD storage components of the SSD storage tier to store data of the further write instructions, the particular SSD storage component being omitted from the set of other SSD storage components.

4. A method as in claim 2 wherein performing the set of remedial activities on the multiple storage tiers further includes:
   while the further write instructions to the particular SSD storage component are being blocked, processing the further write instructions on a set of magnetic disk devices of the HDD storage tier to store data of the further write instructions.

5. A method as in claim 2 wherein performing the set of remedial activities on the multiple storage tiers further includes:
   while the further write instructions to the particular SSD storage component are being blocked, moving data from the particular SSD storage component to a set of other SSD storage components of the SSD storage tier, the particular SSD storage component being omitted from the set of other SSD storage components.

6. A method as in claim 2 wherein performing the set of remedial activities on the multiple storage tiers further includes:
   while the further write instructions to the particular SSD storage component are being blocked, moving data from the particular SSD storage component to a set of magnetic disk devices of the HDD storage tier.

7. A method as in claim 2, further comprising:
   after blocking the further write instructions to the particular SSD storage component of the SSD storage tier during the predefined amount of time and in response to expiration of the predefined amount of time, establishing a new write quota for the particular SSD storage component of the SSD storage tier, the new write quota (i) replacing the particular write quota and (ii) identifying a new amount of data that is permitted to be written to the particular SSD storage component during another predefined amount of time;

consuming the new write quota in response to new write operations performed on the particular SSD storage component of the SSD storage tier; and in response to the new write quota for the particular SSD storage component of the SSD storage tier becoming fully consumed, performing a new set of remedial activities on the multiple storage tiers to protect operation of the particular SSD storage component of the SSD storage tier.

8. A method as in claim 2 wherein establishing the write quotas for the SSD storage components of the SSD storage tier includes:

generating health indicators for the SSD storage components of the SSD storage tier, each health indicator indicating a measure of healthiness for a respective SSD storage component of the SSD storage tier.

9. A method as in claim 8 wherein generating the health indicators for the SSD storage components of the SSD storage tier includes:

receiving error counts from the SSD storage components of the SSD storage tier; and deriving the health indicators for the SSD storage components of the SSD storage tier based on the error counts received from the SSD storage components.

10. A method as in claim 9 wherein deriving the health indicators for the SSD storage components of the SSD storage tier based on the error counts received from the SSD storage components includes:

deriving a first health indicator for a first SSD storage component of the SSD storage tier based on a first set of error counts received from the first SSD storage component, the first set of error counts identifying a respective set of errors encountered by the first SSD storage component during operation of the first SSD storage component; and deriving a second health indicator for a second SSD storage component of the SSD storage tier based on a second set of error counts received from the second SSD storage component, the second set of error counts identifying a respective set of errors encountered by the second SSD storage component during operation of the second SSD storage component.

11. A method as in claim 10 wherein establishing the write quotas for the SSD storage components of the SSD storage tier further includes:

providing the write quotas for the SSD storage components of the SSD storage tier based on the health indicators generated for the SSD storage components of the SSD storage tier.

12. A method as in claim 11 wherein providing the write quotas for the SSD storage components of the SSD storage tier includes:

generating the write quotas for the SSD storage components of the SSD storage tier based on (i) the health indicators generated for the SSD storage components of the SSD storage tier and (ii) specified periods of usage time remaining for the SSD storage components of the SSD storage tier.

13. A method as in claim 12 wherein generating the write quotas for the SSD storage components of the SSD storage tier based on the health indicators generated for the SSD storage components of the SSD storage tier and the specified periods of usage time remaining for the SSD storage components of the SSD storage tier includes:

deriving a first write quota for the first SSD storage component of the SSD storage tier based on the first health indicator for the first SSD storage component, the first health indicator indicating a measure of healthiness for the first SSD storage component of the SSD storage tier, and the first write quota indicating an amount of data that is permitted to be written to the first SSD storage component during the predefined amount of time; and deriving a second write quota for the second SSD storage component of the SSD storage tier based on the second health indicator for the second SSD storage component, the second health indicator indicating a measure of healthiness for the second SSD storage component of the SSD storage tier, and the second write quota indicating an amount of data that is permitted to be written to the second SSD storage component during the predefined amount of time.

14. A method as in claim 13 wherein consuming the write quotas includes:

consuming the first write quota for the first SSD storage component and the second write quota for the second SSD storage component at different rates in response to data being written to the first SSD storage component and the second SSD storage component at different rates during a same window of time.

15. A method as in claim 13, further comprising:

in response to a change in usage pattern of the first SSD storage component, updating the first write quota from a first amount of data that is permitted to be written to the first SSD storage component during the predefined amount of time to a second amount of data that is permitted to be written to the first SSD storage component during the predefined amount of time, the second amount of data being different from the first amount of data.

16. A method as in claim 13, further comprising:

updating the first health indicator from a first measure of healthiness for the first SSD storage component to a second measure of healthiness for the first SSD storage component, the second measure of healthiness being different from the first measure of healthiness.

17. A method as in claim 13 wherein deriving the first write quota for the first SSD storage component of the SSD storage tier includes ascertaining a remaining number of program erase (PE) cycles available for the first SSD storage component based on (i) the first health indicator for the first SSD storage component and (ii) a current total number of PE-cycles performed by the first SSD storage component;

wherein deriving the second write quota for the second SSD storage component of the SSD storage tier includes ascertaining a remaining number of PE-cycles available for the second SSD storage component based on (i) the second health indicator for the second SSD storage component and (ii) a current total number of PE-cycles performed by the second SSD storage component; and wherein the current total number of PE-cycles performed by the first SSD storage component and the current total number of PE-cycles performed by the second SSD storage component are different.

18. Data storage equipment, comprising:

a host interface operative to communicate with a set of host computers;

a storage interface operative to communicate with multiple data storage tiers including a solid state drive (SSD) storage tier having SSD storage components and a hard disk drive (HDD) storage tier having magnetic disk devices;
memory; and
control circuitry coupled to the host interface, the storage interface, and the memory, wherein the memory stores instructions which, when carried out by the control circuitry, cause the control circuitry to:
establish write quotas for the SSD storage components of the SSD storage tier, each write quota identifying an amount of data that is permitted to be written to a respective SSD storage component during a predefined amount of time in response to write requests from the set of host computers,
consume the write quotas in response to write operations performed on the SSD storage components of the SSD storage tier, and
in response to a particular write quota for a particular SSD storage component of the SSD storage tier becoming fully consumed, perform a set of remedial activities on the multiple storage tiers to protect operation of the particular SSD storage component of the SSD storage tier while the SSD storage tier operates concurrently with the HDD storage tier having the magnetic disk devices to store data on behalf of the set of host computers;
wherein each of the SSD storage components of the SSD storage tier has a respective pre-specified program-erase cycle lifetime limit; and
wherein the control circuitry is further constructed and arranged to:
while consuming the write quotas for the SSD components of the SSD storage tier, write data to particular SSD storage components of the SSD storage tier after the respective pre-specified program-erase cycle lifetime limits of the particular SSD storage components have been exceeded.

19. A computer program product having a non-transitory computer readable medium which stores a set of instructions to operate multiple data storage tiers including a solid state drive (SSD) storage tier having SSD storage components and a hard disk drive (HDD) storage tier having magnetic disk devices; the set of instructions, when carried out by computerized circuitry, causing the computerized circuitry to perform a method of:
establishing write quotas for the SSD storage components of the SSD storage tier, each write quota identifying an amount of data that is permitted to be written to a respective SSD storage component during a predefined amount of time;
consuming the write quotas in response to write operations performed on the SSD storage components of the SSD storage tier; and
in response to a particular write quota for a particular SSD storage component of the SSD storage tier becoming fully consumed, performing a set of remedial activities on the multiple storage tiers to protect operation of the particular SSD storage component of the SSD storage tier;
wherein each of the SSD storage components of the SSD storage tier has a respective pre-specified program-erase cycle lifetime limit; and
wherein the method further comprises:
while consuming the write quotas for the SSD components of the SSD storage tier, writing data to particular SSD storage components of the SSD storage tier after the respective pre-specified program-erase cycle lifetime limits of the particular SSD storage components have been exceeded.

20. A method as in claim 1, further comprising:
for a first SSD component that exhibits above average errors, adjusting a respective write quota for the first SSD component to prevent operating the first SSD component before the pre-specified program erase cycle lifetime limit of the first SSD component is reached; and
for a second SSD component that exhibits below average errors, adjusting a respective write quota for the first SSD component to continue operating the second SSD component beyond the pre-specified program erase cycle lifetime limit of the second SSD component.

* * * * *